(12) United States Patent  
Desalvo et al.

(10) Patent No.: US 8,480,244 B2  
(45) Date of Patent: Jul. 9, 2013

(54) METHODS AND DEVICES FOR DIRECTIONAL RADIATIVE COOLING THERMAL COMPENSATION

(75) Inventors: Riccardo Desalvo, Pasadena, CA (US); Carl Justin Kamp, Gothenburg (SE); Roberto Passaquieti, Cascina (IT); Yury Minenkov, Montecompatri (IT)

(73) Assignee: California Institute of Technology, Pasadena, CA (US)

( * ) Notice: Subject to any disclaimer, the term of this patent is extended or adjusted under 35 U.S.C. 154(b) by 665 days.

(21) Appl. No.: 12/699,023

(22) Filed: Feb. 2, 2010

(65) Prior Publication Data

US 2010/0200209 A1    Aug. 12, 2010

Related U.S. Application Data

(60) Provisional application No. 61/206,961, filed on Feb. 6, 2009.

(51) Int. Cl.
*G02B 5/08*    (2006.01)

(52) U.S. Cl.
USPC ........................................................ 359/866

(58) Field of Classification Search
USPC ........................................................ 359/866
See application file for complete search history.

(56) References Cited

PUBLICATIONS

The Advanced Virgo Team, Advanced Virgo Conceptual Design, Oct. 26, 2007, VIR-042A-07, 1-95.

Ballmer, S., et al., Thermal Compensation System Description, Laser Interferometer Gravitational Wave Observatory (LIGO) Apr. 23, 2005, LIGO-T050064-00-R, 1-21.

Barsotti, L., et al., Virgo Automation: Thermal Transient and Transition to Low-Noise, VIRGO Jan. 31, 2007, 1-6.

Black Body Emission Calculator, http://infrared.als.lbl.gov/content/black-body-emission-calculator, 2008, retrieved on Oct. 1, 2010.

Day, R., et al., Thermal Compensation Simulation, VIRGO, LSC-Virgo Meeting Aug. 24, 2008, Amesterdam, LIGO-G080544-00-ZZ, 1-34.

Engineering Tool Box, http://www.engineeringtoolbox.com/, 2010, retrieved on Oct. 1, 2010.

Fristschel, P., Advanced LIGO Systems Design, Laser Interferometer Gravitational Wave Observatory (LIGO) Jun. 27, 2001, LIGO-T010075-00-D, 1-24.

Gretarsson, A., et al., Effects of Mode Degeneracy in the LIGO Livingston Observatory Recycling Cavity, Journal of the Optics Society of America B 2007, 24: 2821-2828.

Harry, G., et al., Titania-doped Tantala/Silica Coatings for Gravitational-Wave Detection, Classical Quantum Gravity 2007, 24: 405-415.

Hello, P., et al., Analytical Models of Thermal Aberrations in Massive Mirrors Heated by High Power Laser Beams, Journal of Physics France 1990, 51: 1267-1282.

DeSalvo., et al., Radiative Cooling Thermal Compensation for Gravitational Wave Interferometer Mirrors, Laser Interferometer Gravitational Wave Observatory (LIGO) Aug. 12, 2008, Pasadena, 1-38.

(Continued)

*Primary Examiner* — Jade R Chwasz

(74) *Attorney, Agent, or Firm* — Steinfl & Bruno, LLP

(57) ABSTRACT

A radiative thermal compensation system is described. An imaging arrangement located in an optical path between a surface to be thermally compensated (e.g., cooled) and one or more thermal sinks. The imaging arrangement is oriented with respect to the surface and the sinks so that solid angles are defined, along which the sinks are imaged onto the surface and control heat flow from the surface.

31 Claims, 7 Drawing Sheets

PUBLICATIONS

Passaquieti, R., et al., Radiative Cooling Thermal Compensation, LSC-Virgo Meeting Sep. 24, 2008, Amsterdam, 1-24.

Lawrence, R., et al., Active Correction of Thermal Lensing Through External Radiative Thermal Actuation, Optics Letters 2004, 29: 2635-2637.

Lawrence, R., et al., Thermal Compensation Update, MIT Laser Interferometer Gravitational Wave Observatory (LIGO) 2002, 1-81.

Lawrence, R., et al., Adaptive Thermal Compensation of Test Masses in Advanced LIGO, Classical Quantum Gravity 2002, 19: 1803-1812.

Luck, H., et al., Thermal Correction of the Radii of Curvature of Mirrors for GEO 600, Classical Quantum Gravity 2004, 21: 5985-5989.

Miller, J., et al., Thermal Distortions of non-Gaussian Beams in Fabry-Perot Cavities, Classical Quantum Gravity 2008, 25: 235016 (1-17).

Rocchi, A. Status of Thermal Compensation in Virgo, LSC-Virgo Meeting May 24, 2007, Cascina, 1-18.

Smith, M., et al., Auxiliary Optics Support System Conceptual Design Document, vol. 1 Thermal Compensation System, Laser Interferometer Gravitational Wave Observatory (LIGO) Jun. 1, 2007, 1-36.

Fafone, V., et al., TCS Update and R&D, AdVirgo Biweekly Meeting Dec. 18, 2008, 1-27.

Vinet, J.Y., et al., Analytical Models of Transient Thermoelastic Deformations of Mirrors Heated by High Power CW Laser Beams, Journal of Physics France 1990, 51: 2243-2261.

Zhao, C., et al., Compensation of Strong Thermal Lensing in High-Optical-Power Cavities, Physics Review Letters 2006, 96: 231101 (1-4).

METHODS AND DEVICES FOR DIRECTIONAL RADIATIVE COOLING THERMAL COMPENSATION

CROSS REFERENCE TO RELATED APPLICATIONS

The present application claims priority to U.S. provisional patent application No. 61/206,961 filed on Feb. 6, 2009 and incorporated herein by reference in its entirety.

STATEMENT OF GOVERNMENT GRANT

The U.S. Government has certain rights in this invention pursuant to Grant No. PHY0823459 awarded by the National Science Foundation.

BACKGROUND

Some devices are intended to be subject to high amounts of thermal power, which can cause thermal deformation and other associated problems that can limit sensitivity in a general sense. For example, the Ad-LIGO [see reference 1, incorporated herein by reference in its entirety] and Advanced Virgo [see reference 2 incorporated herein by reference in its entirety] main Fabry Perot minors are intended to be subject to nearly 1 MW of standing laser light over a Gaussian spot size of ~6 cm radius.

The current limit for high reflectivity coatings is absorption of roughly 0.25 ppm of the reflected beam. An absorption level around 0.3-0.4 ppm is routinely obtained on high reflectivity minors by use of Ti doped $Ta_2O_5$ [see reference 3, incorporated herein by reference in its entirety]. The advanced interferometers' design specifications call for a target of 0.5 ppm absorption, and a maximum of 1 ppm [see references 4, 5 incorporated herein by reference in their entirety]. Thus, the mirrors will be subject to 0.25 to 1 W of heating with a power distribution that matches that of the stored beam.

Such heating would produce a minor deformation (thermal lensing) that would impede the full performance of the interferometer [see references 6-8 incorporated herein by reference in their entirety]. This effect is particularly damaging to the mode profile matching of the main beam stored in the main, 3 or 4 km Fabry Perot cavities to the RF modulated sidebands stored in the short section of the Michelson interferometer, which are used to control the interferometer [see reference 9, incorporated herein by reference in its entirety]. This problem can occur at lower power, due to the higher absorption of older designs minors [see references 10-13 incorporated herein by reference in their entirety].

To mitigate this problem a Thermal Compensation System (TCS), which shapes an annular $CO_2$ laser beam and projects such beam on the mirror periphery, has been implemented in the present LIGO and Virgo. The $CO_2$ beam is absorbed within microns by the silica on the surface of the mirror and produces a thermal deformation balancing that which has been produced by the stored laser beam heat.

This relatively simple solution is not acceptable in the advanced detectors due to the difficulties in stabilizing a $CO_2$ laser intensity. The thermo-elastic noise and the radiation pressure fluctuations imposed on the test masses from the TCS would overwhelm the Gravitational Wave (GW) signal.

A solution to avoid disturbing the very sensitive main Fabry Perot minors is to implement, behind the inner test masses, a hot ring and a Compensation Plate (CP) acted on by a $CO_2$ laser [see references 14, 15 incorporated herein by reference in their entirety]. The hot ring annular heating technique has been tested directly on the test masses to modify the radius of curvature of a test mass in the GEO interferometer [see reference 16, incorporated herein by reference in its entirety]. An Ohmic heating ring was placed within few mm from the minor surface.

The hot ring technique will be applied in Advanced LIGO for thermal lensing corrections. In Advanced LIGO the radial escape from the CP of the applied heat limits the correction effectiveness, thus gold plating will be applied to the CP barrel surface to depress its radial black body radiation. The negative thermal lensing thus applied on the CP will sufficiently compensate for the deformation of the main mirrors.

However, the above solutions are less than ideal because they are directed at mitigating with a counter deformation the negative effects of a deformation on the mirror.

SUMMARY

According to a first aspect, a radiative thermal compensation system is provided, comprising: a surface to be thermally compensated, having a first thermal emission behavior; one or more thermal sinks, having a second thermal emission behavior; and an imaging arrangement located in an optical path between the surface to be thermally compensated and the one or more thermal sinks, wherein the imaging arrangement acts substantially as a white body, wherein orientation of the imaging arrangement with respect to the surface to be thermally compensated and the one or more thermal sinks defines one or more solid angles along which the one or more thermal sinks are imaged onto the surface to be thermally compensated and control heat flow from the surface to be thermally compensated without physical contact between the surface to be thermally compensated and the one or more thermal sinks.

Further embodiments of the disclosure are provided in the specification, drawings and claims of the present application.

DESCRIPTION OF EXAMPLE EMBODIMENTS

Figures 1A, 1B:
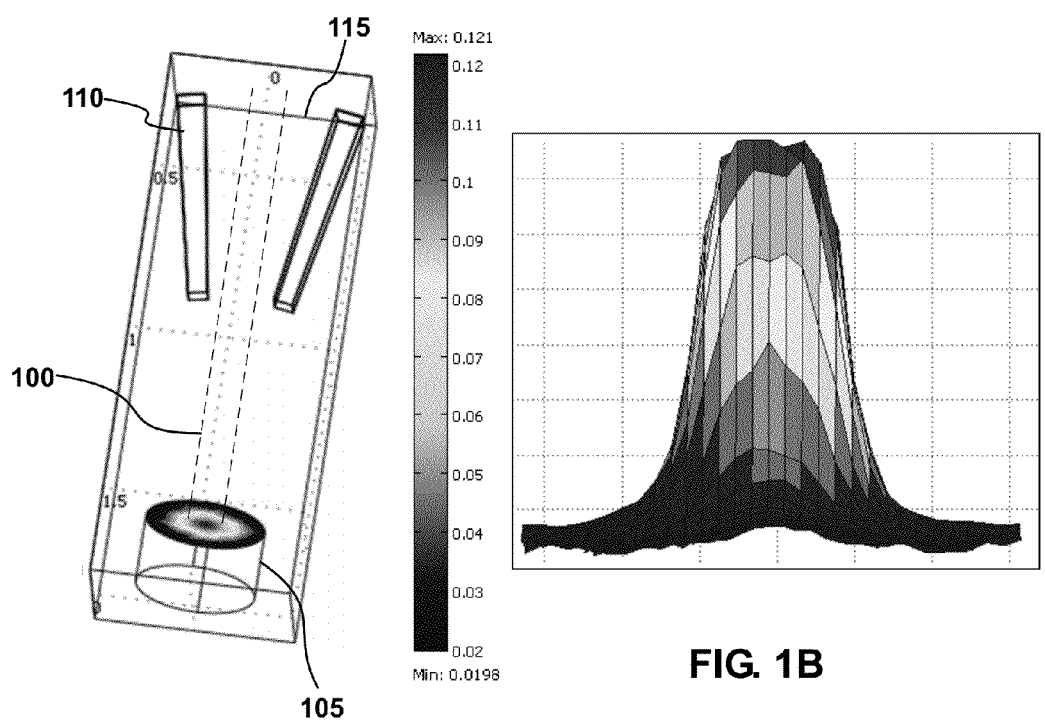
FIG. 1A shows a schematic view of an embodiment of the present disclosure with wedged baffles.
FIG. 1B shows a heat distribution curve in conjunction with the embodiment of FIG. 1A.

In accordance with the teachings of the present disclosure, localized heat extraction can be implemented via directional radiative thermal control (e.g., cooling) of the beam spot. Throughout the present application, directional radiative thermal control (e.g., cooling) is defined as the manipulation of the natural heat exchange (heat flow) from a surface by redirecting a portion of its natural radiative emission to another, (e.g., colder) surface acting as a selective trap and by controlling or manipulating (e.g., impeding) the return heat path. This technique is capable to generate controlled heat flow manipulation (e.g., cooling) without the application of external power or forces.

More in particular, directional radiative cooling (DRC) refers to remote imaging of a cold surface (or sink) onto a hot surface by taking advantage of the differences in thermal emission of the respective hot and cold surfaces and by using an imaging arrangement acting substantially as a white body to image the portion of the radiation emitted from the hot surface onto the sink where it is absorbed and not returned. Thermal emission of the hot surface is defined as the amount of energy normally lost from the hot surface through radiation transfer. According to several embodiments of the present disclosure, the sink acts substantially as a black body.

By way of example and not of limitation, the imaging arrangement can comprise highly-reflective, parabolic offset mirrors or wedged baffles, as later shown in additional detail. A mirror with high reflectivity in the infrared effectively acts substantially as a white body, with no black body emission from the solid angle that it covers.

Turning to the example discussed in the background section of the present application, the stored laser beam spot in an Advanced Gravitational Wave (GW) observatory will be 6 cm in radius. According to an embodiment of the disclosure, the coatings of the mirrors of the imaging arrangement can be capped by a silica layer, whose thermal radiation is very close to that of a black body (emissivity $\epsilon$-0.93 [see reference 17, incorporated herein by reference in its entirety]). According to the Stefan Boltzmann law, a 6 cm radius disk with black body emissivity at room temperature (~300K) continuously exchanges ~1.64 W/str with the thermal bath [see references 18-19 incorporated herein by reference in their entirety]. This means that if a zero Kelvin black body disk is placed in front of the beam spot, it would remove much more than the 0.25-1 W of heat expected to be dissipated by the stored beam.

However, if implemented as is, the cooling surface provided by the black body disk would obstruct the beam itself. Fortunately, the expected deposited power is low enough that the stored beam spot does not need to be cooled for the entire $2\pi$ solid angle (thus obstructing the beam line), nor is there a need for a zero Kelvin black body to effectively collect the radiant heat. By way of example, a sufficiently cold black body, such as a liquid nitrogen cooled target, can be provided on the beam spot from a sufficiently large solid angle. Applicants calculated that a solid angle coverage of a quarter to one steradian of a liquid nitrogen-cooled surface is sufficient to absorb the expected power dissipation and eliminate its ill effects at the source.

The above teachings can be implemented while keeping all thermal imaging equipment completely clear of the aperture or beam line between the main minors, i.e. the Fabry-Perot minors of this exemplary application. Moreover, embodiments of the present disclosure can be provided where the sink shape and the focusing of the sink imaging closely mimic the profile (e.g., a Gaussian profile) of the energy deposited by the beam. Throughout the present disclosure, the term "focusing" will be used to generally intend positioning and/or deformation of the imaging arrangement between the hot surface and the sink. Such positioning is usually initially calculated or simulated and then can be adjusted.

The present disclosure will make reference to examples directed to thermal compensation for gravitational interferometer minors. However, the person skilled in the art will understand that the teachings of the present disclosure can be applied to other fields, by remotely manipulating the thermal profile of any surface with high emissivity (reasonably close to that of a black body) and operating at sufficient high temperature that it radiates more thermal power than the required cooling power.

According to several embodiments of the present disclosure, DRC can be based on the radiant heat constantly emitted by a body at room temperature. In particular, embodiments of the present disclosure are directed at tuning such heat to maintain at a constant temperature (e.g., ambient temperature) or within a temperature range the temperature of a body or surface such as a hot spot (e.g., a mirror subjected to power deposition), without allowing the hot spot to heat or cool by any amount. The heat extraction effectiveness of the technique drops as $T^4$ in accordance with the Stephan-Boltzmann law. Therefore, the teachings of the present disclosure are especially suitable for surfaces operating above room temperature.

Further applications of the present disclosure can be directed at generating cold spots in otherwise thermally uniform surfaces.

Two exemplary embodiments based on directional heat extraction techniques will be discussed in detail in the next paragraphs. The first embodiment involves the use of pyramidal baffles to image a relatively large, Liquid-Nitrogen-cooled black body surface on the stored beam hot spot and was studied with COMSOL Multiphysics™ Finite Element Modeling. The second embodiment, tested in laboratory, makes use of a polished, gold-plated parabolic mirror to image a small, chilled black body onto the hot spot. More than one mirror/sink units can be used to cover an additional amount of solid angle and match the cooling power requirements.

Baffled Embodiment

Figure 2:
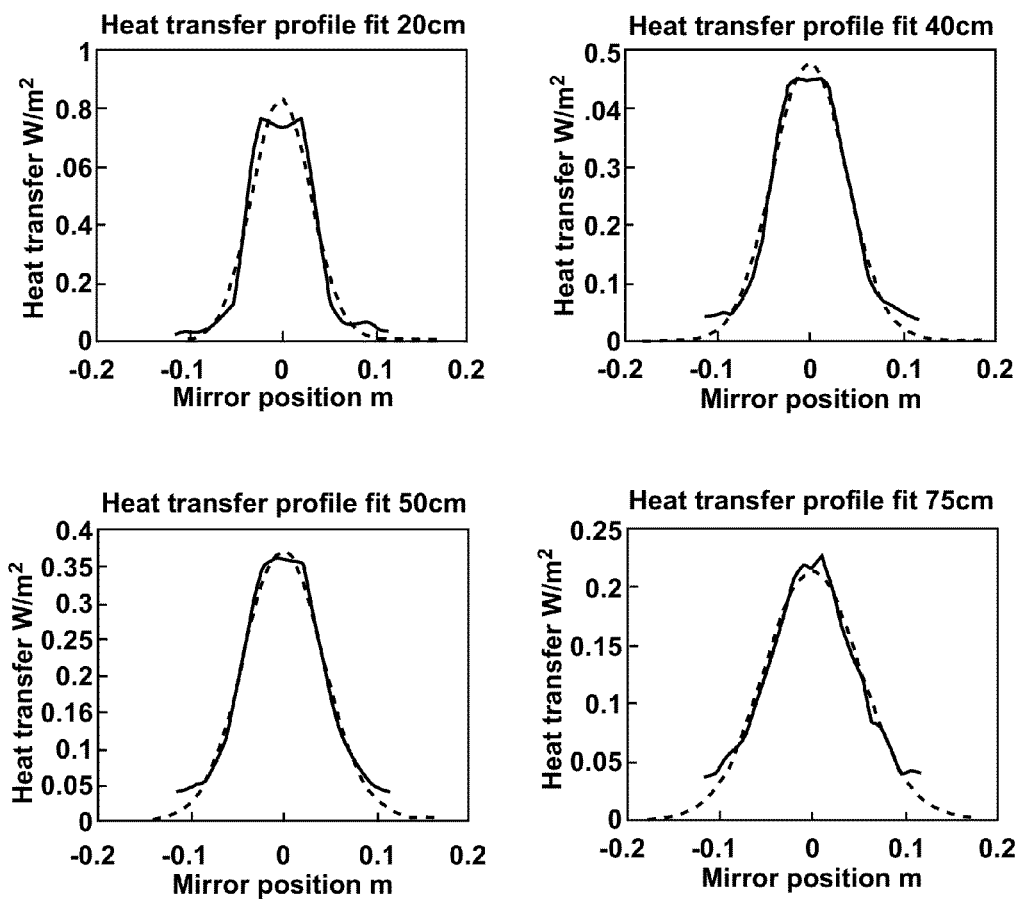
FIG. 2 shows examples of calculated heat extraction profiles in conjunction with the embodiment of FIG. 1A.

Reference can be made to FIGS. 1A, 1B and 2. In order to expose a beam spot (105) (e.g., a laser spot) to a chilled surface over a steradian angle, a black body surface (e.g., a nitrogen-chilled 1 m² black body surface) can be positioned at a distance (e.g., a 1 meter distance) from the beam spot source (e.g., a minor), offset from the beam line (100). Such a sink would however chill the entire mirror, not just the beam spot. To limit the exposure to the beam spot only, directionality is provided by shading the sink with wedged baffles (110, 115). By way of example, the baffles can be room-temperature, wedged egg crate baffles having a truncated pyramid shape. The baffles (110, 115) can be configured and oriented so that just the beam spot sees the sink. By way of example, the beam spot size as seen by the sink can be adjusted by altering the aspect ratio of the truncated pyramids. Moreover, the number of pyramids in the egg-crate can be adjusted to match the required amount of extracted power due to the additive property on the heat transfer. The whole structure of FIG. 1A can be located in a vacuum chamber in cases like the one of the present example where the hot surface (in this case the Fabry-Perot minors) is located in a vacuum environment such as a ultra high vacuum (UHV) environment. The person skilled in the art will understand that both embodiments (vacuum and non-vacuum) fall within the teachings of the present disclosure. Should a non-vacuum environment be provided, heat absorption by gas molecules can be taken into account.

FIG. 1B shows a three-dimensional representation of the calculated heat extraction (cooling) profile of the mirror surface (W/m²) at a 50 cm separation between the sink (e.g., a chilled plate) behind the baffles (110, 115) and the warm test mass surface (105). In particular, the x and y axes (horizontal) represent position on the minor surface, while the z axis (vertical) represents the heat transfer profile in W/m². When fitted with a Gaussian curve, the $R^2$ value is 0.947.

With reference to FIG. 2, the four quadrants depict the calculated heat extraction profiles with baffle separations of 20 cm, 40 cm, 50 cm and 75 cm respectively from the sink to the warm surface of the test mass. In the specific case of a GW interferometer, the test masses are the Fabry-Perot mirrors at the end of the interferometer arms. The smooth Gaussian curve ($y_{fit}=\text{beta}_1*e(-2X^2)/(\text{beta}_2)^2$), which is given by the dashed line, is fit to the data, given by the solid line, to illustrate the shape matching of the projected sink shape to that of the laser spot (105) as the directional radiative cooling device increases in distance from the mirror surface.

Modulation of the heat extraction or cooling power can be obtained through variation of the number of the baffles and/or variation of the temperature of the sink. The profile of the sink as seen by the beam spot (105) can be varied by varying the cross section size and the convergence angle of the baffles or, equivalently, the distance of the baffles from the mirror, are useful tools to change the chilled spot profile. As shown in the four examples of FIG. 2, the heat flow distribution can reasonably well match with a Gaussian profile by appropriately choosing the aspect ratio of the baffles.

Parabolic Minor Embodiment

Figure 3:
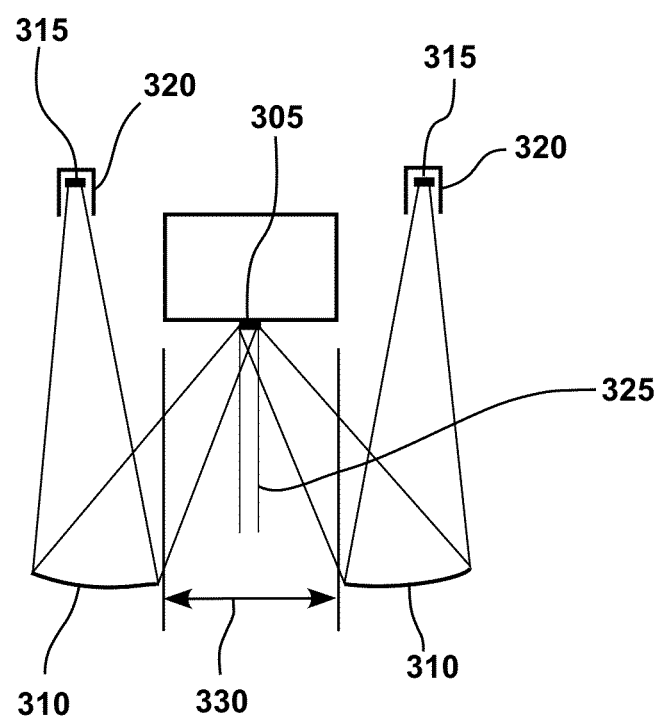
FIG. 3 shows a schematic view of an embodiment of the present disclosure with parabolic mirrors.

FIG. 3 shows a schematic diagram of an embodiment of the present disclosure where parabolic mirrors are used. The hot spot (305) (such as the hot spot caused by the stored laser beam on the interferometer Fabry-Perot minors of the exemplary application discussed in the background section of the application) is imaged through an imaging arrangement (310, 315). In the exemplary embodiment of FIG. 3, the imaging arrangement is comprised of minors (310) and respective sinks (315). The minors (310) can be, for example, offset, polished, gold plated, parabolic mirrors. If desired, the two targets (315) can be housed by suitable thermal shields (320) to avoid affecting the mirrors (310) and to minimize heat losses. Therefore, the person skilled in the art will understand that the number of mirrors or, more generally, imaging arrangements, will depend on the particular application in accordance with the amount of solid angle (steradian) required for imaging.

Similarly to the embodiment of FIG. 1A, also the structure of FIG. 3 can be located in a vacuum chamber. The sinks (315) can be incorporated in the walls of the vacuum chamber in order to keep the liquid nitrogen out of the chamber due to potential noise interferences.

As shown in FIG. 3, the mirrors (310) are offset with respect to the laser beam (325) and separated by a distance (330) to avoid obstructing the laser beam (325) itself, thus providing an unobstructed observation window to the hot spot or surface (305). The person skilled in the art will understand that other embodiments and applications are possible, where the mirror or minors (310) do not need to be offset. The person skilled in the art will also understand that offsetting considerations should be balanced with the amount of the solid angle (steradian) of radiation that is desired to be redirected to the sink or sinks (315) through the minor (310). In other words, any angle or position of the offset is acceptable as long as a sufficient amount of solid angle of radiation can be captured from the hot spot or surface (305).

In some embodiments the minors (310) can be parabolic, due to the superior focusing capabilities of a parabola. In some other embodiments, spherical mirrors can be used. As also mentioned above, embodiments are also possible where the shape of the imaging arrangement is adjustable. For example, mirrors can be shaped or deformed by way of quadrupole actuators. Shaping of the mirrors (310) can also depend on the desired heat extraction profile, as also mentioned above with reference to the embodiment of FIGS. 1A and 1B.

As also mentioned before, the mirror or mirrors (310) are so configured to behave substantially as a white body, meaning that the absorption of electromagnetic energy of the minors (310) should be negligible with respect to the amount of energy reflected from the mirror surface (310). By way of example, polished gold has an emissivity of about 0.02 and has a behavior close to that of a white body.

In particular, polished gold surfaces are white bodies to a 96.5-98.2% level [see reference 17 incorporated herein by reference in its entirety], they emit only 1.8-3.5% of black body radiation towards the minor (310) and, apart from the reflection used and shown in FIG. 3, do not contribute to the heat exchange process. The heat radiated at room temperature by the laser spot (305), which can be ~1.64 W/str as stated previously, is absorbed by the target (315) and not returned, thus generating actual cooling. The target or targets (315) are configured as near black bodies in order to absorb the radiation incoming from the hot spot (305) through the mirror or minors (310). Configuration of the target or targets (315) will also depend on the surface contour of the target (315), which contour can be designed to further trap the incoming radiation in order to increase the emissivity of the target (315), as also discussed later.

As also mentioned above, the cooling power of the arrangement shown in FIG. 3 will depends on the solid angle seen from the beam spot (305) and the emissivity of both the mirrors (310) (which has to be reduced) and sink (315) (which has to be increased).

In general terms, DRC as shown in FIG. 3 can be defined by the following approximated equation:

$$(1-\epsilon_{mirror})*(\epsilon_{hotspot}\sigma T_{hotspot}^4)*(\text{Area}(str))=\text{the dissipated heat, with a given profile from the hot surface}$$

The sink then removes nearly all or just a portion of the dissipated heat depending on the application. DRC is therefore a function of the emissivity of the minor surface, the emissivity of the hot surface, the temperature of the hotspot, and the area of the hemisphere seen by the mirror, as well as the emissivity and temperature of the cold surface. Furthermore, the minor can be of various shapes and curvatures.

From a comparison between embodiment of FIG. 3 and the embodiment of FIG. 1A, the person skilled in the art will be able to note that the embodiment of FIG. 3 is much less bulky and simpler than the heavily baffled, large cryogenic structures of the embodiment shown in FIG. 1A.

The cold wells are thus reduced to small targets (315), which can be of the same size of the laser spot (305) (e.g., a circle of about 6 cm radius in the Fabry-Perot minor example discussed above), and be housed at the bottom of bucket-shaped cryostats (320) to avoid exposing the test mass (such as the Fabry-Perot mirror of the example discussed above) to unwanted cooling and minimize the chilling power consumption, thus reducing the cooling power losses and focusing the cooling power of the sink. As also mentioned above, size and shape of the sink (315) could be used as parameters that allow control of the heat extraction profile in accordance with the embodiment of FIG. 3.

Perfect imaging of a flat, sink (315) on the mirror (305) would produce a rectangular sink profile adequate for compensating a mesa beam, but hardly a match for the Gaussian heat extraction profile. Therefore, embodiments of the present disclosure are provided where a heat extraction profile is engineered or refined through presence of a diaphragm to be coupled with a sink by placing the diaphragm in front of the sink (315).

Figure 4:
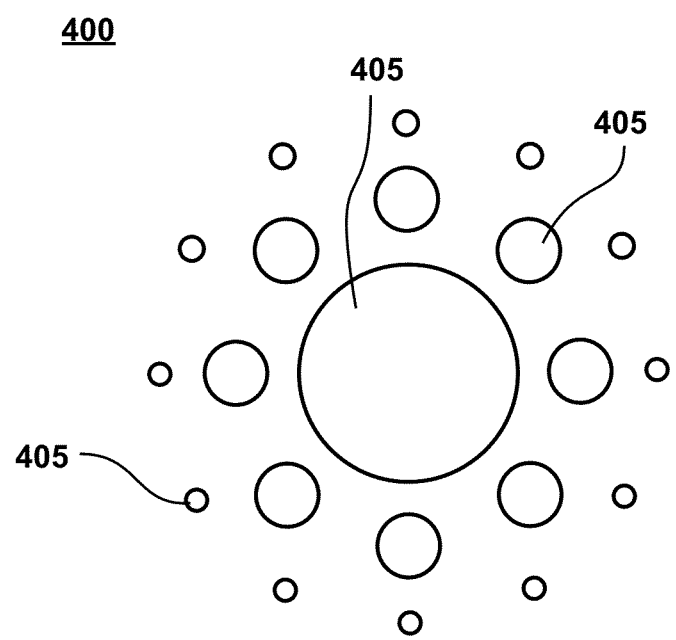
FIG. 4 shows an example of a diaphragm to be used in conjunction with a cold target (thermal sink) according to the disclosure.

By way of example, FIG. 4 shows an embodiment of a possible diaphragm (400) to be used to refine the shape of the cooled spot profile and obtain a desired heat extraction profile. In particular, the embodiment of FIG. 4 shows a diaphragm shape intended to produce a Gaussian heat extraction profile due to the spatial arrangement and shape of the circular holes (405).

Diaphragms like the one shown in FIG. 4 can potentially form as precise a cooling spot as desired. Properly shaped diaphragms can also potentially provide shaped cooling power to compensate for any non-uniform absorption in the coating materials in presence of an a priori and precise mapping of the absorption non-uniformity of each minor or hot spot. In other words, through the use of a diaphragm, the sink that is imaged onto the hot surface is shaped by the diaphragm, thus controlling the heat transfer.

Cooling Power Controls

In the following paragraphs, techniques for controlling the cooling power of the sinks (315) will be discussed. These techniques provide a means for controlling the cooling power of the sink and match the variable heating power as the hot spot is operated at variable power (or, for example, when the interferometer falls out of lock in the example provided in the background of the application).

Figure 6:
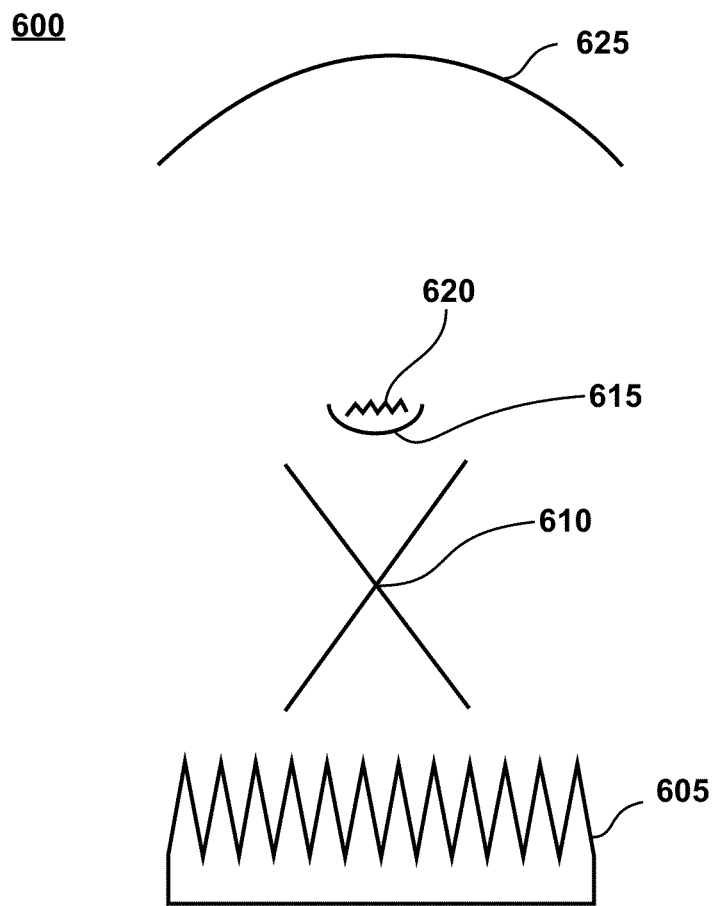
FIG. 6 shows an example of an arrangement for fast tuning of radiative cooling power.

A first technique addresses changing of the sink temperature. A second technique aims at placing a shielded heating resistor in front of the sink to return to the minor part of the black body heat taken by the sink, as shown in FIG. 6. Further, according to a third technique, shown in FIG. 7, irises can be placed in front of the sinks.

Figure 5:
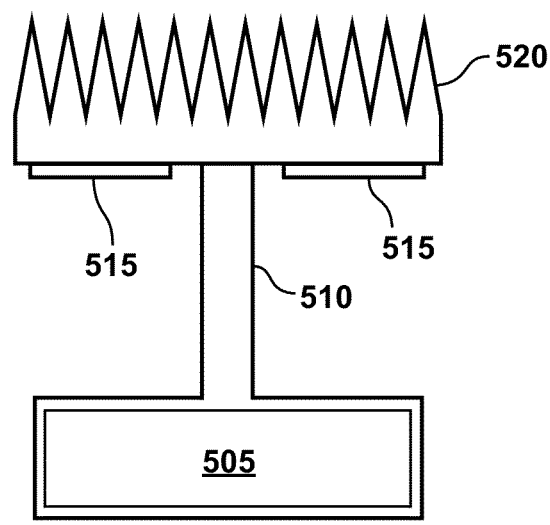
FIG. 5 shows an example of a tunable-temperature sink arrangement.

FIG. 5 shows an embodiment of a tunable-temperature cold sink arrangement. The most relevant parts of the cold sink (500) shown in the figure are a thermal bath (505) and a target head (520). A stem (510), electrical resistors (515) or other means to control the heat flow inside the sink arrangements can be used to tune the surface temperature of the cold sink (500), which in turn determines the heat flow. By way of example, the thermal bath (505) can be liquid nitrogen kept at 77° K. The thermal conductivity of the stem (510) can be engineered to adjust the cooling power of the target head (520). In particular, the electrical resistors (515) are used to balance the heat flow from the thermal bath (505) and modulate the temperature of the target head (520). In this arrangement the thermal time constant of the cold sink (500) and therefore of the heat flow, is determined by the thermal resistance of the stem (510) and by the heat capacitance of the target head (520).

In the exemplary embodiment shown in FIG. 5, the thermal resistivity of the stem (510) can be adjusted to reduce the cooling power requirements from the cold thermal bath (505) at the expense of the response time. Changing the flow and temperature of the cryogenic liquid used to generate the thermal bath (505) is another way to change the temperature of the sink (500). Methods to control the sink temperature depend from the specific requirements of the system to be cooled. The reaction time varies depending on the size of the overall system, and can vary from a millisecond scale to minutes. The exemplary pyramidal structure of the target head (520) shown in FIG. 5 is intended to trap the incoming radiation into multiple reflections. This has the effect of increasing the effective target black body thermal emissive (absorptive) power. In the specific case of a GW interferometer it also serve to safely trap and absorb all scattered laser light from the hot target (e.g., minor) image. This is a consequence of the fact that the mirror or mirrors (310) shown in FIG. 3 image on the cold target sink all electromagnetic radiation, including all light scattered from the hot spot.

It should be noted that it is relatively difficult to significantly raise the temperature of liquid nitrogen without inducing noisy boiling. This problem can be alleviated with the pyramidal shaping of the target head (520) shown in FIG. 5, due to the presence of back reflections) and by taking advantage of the material conductivity of the stem. Alternative embodiments of the sink are also possible. For example, the reservoir containing the thermal bath (505) could be directly attached to the target head (520) without the presence of a stem (510).

In an alternative embodiment, a coarse/fine tuning combination can be provided, where a diaphragm like the one shown in FIG. 4 is used for gross cooling power tuning, while the embodiment of FIG. 5 is used for small and/or transient power corrections.

In some cases (for example, in order to form a Gaussian cooling spot profile) it is convenient to position the sink away from the mirror focal plane, because otherwise only a very small area of the sink can be utilized. In this respect, a further, technically easier, embodiment is provided, where the sink is located behind the focal plane of the mirror, and a small, shielded, resistor-heated target is positioned in front, as seen in FIG. 6.

In particular, FIG. 6 shows an arrangement (600) for fast tuning the radiative cooling power. The sink (605), kept at a constant 77° K. by liquid nitrogen, is placed behind the focus (610) of the parabolic mirror (625), while a small resistor (620) (e.g., 1 or 2 cm) shielded by a shield (615) acts as a tunable hot target and can be heated to return to the hot target (e.g., the test mass minor) part of the heat taken by the sink when the interferometer runs at low power. For example, the resistor heating embodiment of FIG. 6 can be used to maintain the test mass radius of curvature when the interferometer falls out of lock and suddenly stops heating, or during tunings with shifting stored beam power levels.

The resistor (620) is placed forward of the focal plane to provide a defocusing that mimics the required Gaussian cooling spot profile. In other words, the resistor (620) returns some of the heat taken from the hot surface, which would affect the profile of the surface. In other words, some of the focused energy is returned, thus defocusing the focused cold image on the hot surface.

Similarly to the sink case, the size of the hot target image (620) on the minor can be adjusted to match the laser spot size by changing its distance from the focal plane. The hot target (620) can be heated in a negligible amount of time in respect to the application by running into it a current feed forward from a power source (not shown in the figure), such as stored power intensity monitors. If required, a back shield (615) can be provided to protect the sink head (605) from the resistor heat.

The scheme shown in FIG. 6 has fast reaction times (low resistor heat capacitance) and does not dump significant power into the thermal bath, yet its heating power fluctuations can generate thermo-elastic noise on the main minor and therefore it should be limited to very small corrections during interferometer operation.

Figure 7:
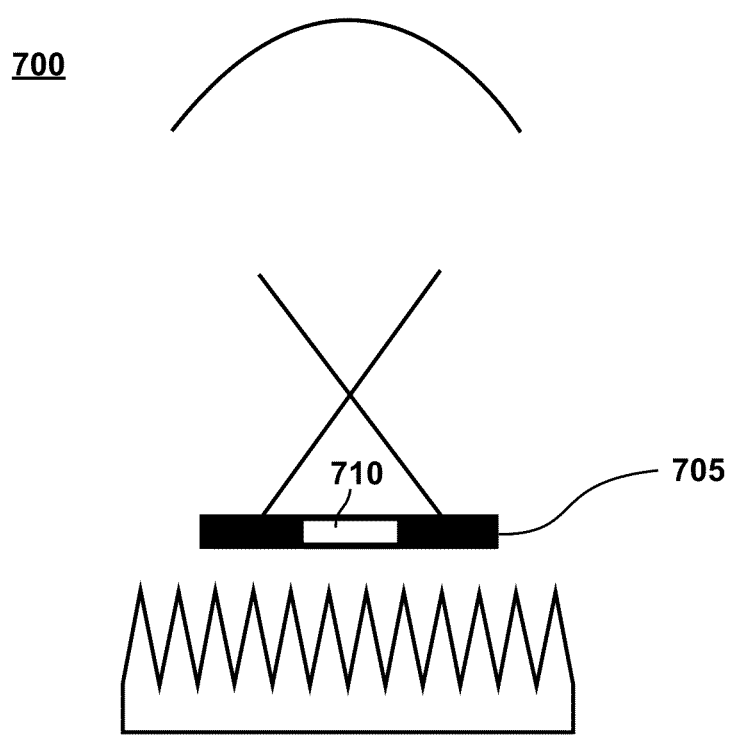
FIG. 7 shows an example of an arrangement for temperature control of a sink by placing irises in front of the sink.

As also briefly mentioned before, a further embodiment dealing with temperature control of the sink provides for placement of irises in front of the sink. Such embodiment is shown in FIG. 7, where an arrangement (700) depicting an iris (705) is presented. The iris (705) can be a diaphragm with an aperture (710), similar to that of a camera. The aperture (710) can be a mechanically actuated, variable aperture. In some environments, such as Ultra High Vacuum environments, custom diameter baffles can be provided in addition to the irises. Such baffles can be used to match the cooling and the deposited power, as well as the size of the projected cold spot. In other words, the location and the size of the baffles can vary and can be symmetrical or nonsymmetrical due to possible irregularities of the hot surface.

Embodiments of the present disclosure can be provided where the heat flow from the surface to be thermally compensated (e.g., cooled) can be controlled through imaging of hot points or profiles on the surface. By way of example and not of limitation, such kind of imaging can be performed with heating rings (see reference 22, incorporated herein by reference in its entirety).

Applicable Fields

The potential application area of DRC is diverse. For example, DRC can be applied for thermal compensation of mesa beams [see reference 20, incorporated herein by reference in its entirety] as well as other wide beam solutions. The larger and flatter beam spot of mesa beams and other types of wide beams emit more radiant heat and would either require cooling from much smaller solid angles, or allow elimination of the thermal lensing from the much larger stored beam powers that may be necessary in even more advanced interferometers.

More generally, the DRC can be applied to anything that requires localized, passive, non invasive heat extraction, free of mechanical noise. DRC can be applied any time there is a sufficient field of sight to the zone of interest and the hot target surface has sufficient black body emission coefficient. DRC can also be used for profiled cooling, or to generate cold spots, on any large surface with a sufficiently large thermal emission coefficient and sufficiently high temperature to radiate more power than it is desired to extract. Therefore, DRC techniques can potentially be utilized in a number of fields, not only used to balance thermal energy but also to generate cold spots. Five exemplary fields of use will be provided in the following paragraphs.

1) Precision optics: The DRC techniques provide a passive non-contacting alternative to conductive cooling systems such as Peltier coolers, which require physical contact with the surface which is to be cooled. The DRC could be used for minor corrections in applications with sufficient energy to cause significant thermal expansion of specific regions of a mirror or lens. The DRC could also be utilized for remote manipulation of minor focal length.

2) Microscopy: A DRC could be used in microscopy for the investigation of controlled, local thermal effects. One example of which is that of scanning electron microscopy (SEM) coupled with a focused ion beam (FIB) which is used to mill thin layers off of a solid coupled with SEM imaging for a quasi-three dimensional SEM image of a sample. In this case, the DRC could be used to control and investigate local thermal effects due to the energy density associated with the ion milling technique.

3) Surface chemistry: DRC can be used to control surface localized thermal gradients in various surface chemistry applications for the experimental reproduction of realistic industrial reaction conditions, as well as to generate precise cold spots for local reaction rate control.

4) Microchip fabrication: Localized thermal control in various fabrication steps, especially that of material deposition.

5) In general, localized, passive heat transfer applications.

The examples set forth above are provided to give those of ordinary skill in the art a complete disclosure and description of how to make and use the embodiments of the methods and devices for directional radiative cooling thermal compensation of the disclosure, and are not intended to limit the scope of what the applicants regard as their disclosure. Modifications of the above-described modes for carrying out the disclosure may be used by persons of skill in the video art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

1] P. Fritschel, "Advanced LIGO Systems Design", 2001, LIGO Document T010075-00
2] The Advanced Virgo Team, "Advanced Virgo Conceptual Design", Virgo note VIR-042A-07
3] G. M. Harry, et al., Class. Quantum Grav., 24 (2), 405 (2007) 5, 29
4] The Advanced Virgo Team, "Advanced Virgo Conceptual Design", Virgo note VIR-042A-07 (2007)
5] P. Fritschel, "Advanced LIGO Systems Design", 2001, LIGO document T010075-00
6] M. Smith and P. Willems, Advanced LIGO TCS Conceptual Design Document, T060083-01-D (2006)
7] P. Hello and J. Vinet, J. Phys. (France) 51, 1267 (1990)
8] P. Hello and J. Vinet, J. Phys. (France) 51, 2243 (1990)
9] Andri M. Gretarsson, et al., "Effects of mode degeneracy in the LIGO Livingston Observatory recycling cavity", JOSAB, Vol. 24, Issue 11, pp. 2821-2828, others (2007)
10] Stefan Ballmer, et al. "Thermal Compensation System Description", T050064-00 (2005)
11] R. Lawrence, M. Zucker, P. Fritschel, P. Marfuta, D. Shoemaker, Classical Quantum Gravity 19, 1803 (2002)
12] L. Barsotti 1, M. Evans, "Virgo Automation: Thermal Transient and Transition to Low-Noise", Virgo note VIR-NOT Issue: 1, January 2007.
13] A. Rocchi, talk at the LSC-Virgo Meeting, Cascina May 24, 2007
14] Ryan Lawrence, David Ottaway, Peter Fritschel, Mike Zucker, Opt. Lett. 29, 2635 (2004).
15] C. Zhao et al., "Compensation of Strong Thermal Lensing in High-Optical-Power Cavities", Phys. Rev. Lett. 96, 231101 (2006)
16] H. Luck, A. Freise, S. Gosler, S. Hild, K. Kawabe, K Danzmann, Classical Quantum Gravity 21, S985 (2004)
17] Engineering toolbox, http://www.engineeringtoolbox.com/ (2009)

[18] J. P. Holman, "Heat Transfer", McGRAW-Hill 8th ed., 1997
[19] Black Body Emission Calculator http://infrared.als.lbl.gov/calculators/bb2001.html (2009)
[20] J Miller, et al., "Thermal distortions of non-Gaussian beams in Fabry-Perot cavities", LIGO DCC P080063-01 (2008)
[21] R. Day, et al., "Thermal compensation simulation", LSC-Virgo Meeting, Amsterdam, 24 Aug. 2008
[22] R. Lawrence, et al., "Thermal compensation update", 2002, LIGO document G020502-00-R

The invention claimed is:

1. A radiative thermal compensation system comprising:
   a surface to be thermally compensated, having a first thermal emission behavior;
   one or more thermal sinks, having a second thermal emission behavior; and
   an imaging arrangement located in an optical path between the surface to be thermally compensated and the one or more thermal sinks, wherein the imaging arrangement acts substantially as a white body,
   wherein orientation of the imaging arrangement with respect to the surface to be thermally compensated and the one or more thermal sinks defines one or more solid angles along which the one or more thermal sinks are imaged onto the surface to be thermally compensated and control heat flow from the surface to be thermally compensated without physical contact between the surface to be thermally compensated and the one or more thermal sinks.

2. The system in claim 1, further comprising one or more additional thermal sinks having a third thermal emission behavior, the one or more additional thermal sinks being adapted to further control the heat flow from the surface to be thermally compensated through imaging of hot points or profiles on the surface to be thermally compensated without contact between the surface to be thermally compensated and the one or more additional thermal sinks.

3. The system of claim 1, wherein the one or more thermal sinks are configured as having emissivity properties substantially as a black body.

4. The system of claim 1, wherein the imaging arrangement comprises one or more mirrors.

5. The system of claim 4, wherein at least one of the one or more mirrors is a spherical or parabolic mirror.

6. The system of claim 1, wherein the surface to be thermally compensated operates along an operative region and wherein the imaging arrangement is located outside the operative region.

7. The system of claim 1, wherein the surface to be thermally compensated is a mirror substantially behaving as a black body.

8. The system of claim 7, wherein the thermal sink is imaged on the mirror to keep the mirror at a constant temperature.

9. The system of claim 8, wherein the temperature is at or above room temperature.

10. The system of claim 1, wherein control of the heat flow from the surface to be thermally compensated increases in effectiveness proportionally to temperature at the fourth degree ($T^4$).

11. The system of claim 1, further comprising a shaped diaphragm placed in front of the thermal sink between the imaging arrangement and the thermal sink, the heat flow from the surface to be thermally compensated being controllable as a function of a shape of the shaped diaphragm.

12. The system of claim 11, wherein the heat flow from the surface to be thermally compensated is controlled in accordance with a desired heat extraction profile.

13. The system of claim 12, wherein the desired heat extraction profile is a Gaussian heat extraction profile.

14. The system of claim 1, further comprising means for controlling cooling power of the one or more thermal sinks.

15. The system of claim 14, wherein the means for controlling the cooling power comprise one or more irises placed in front of the thermal sinks.

16. The system of claim 14, wherein the means for controlling the cooling power comprise means for changing temperature of the thermal sink.

17. The system of claim 14, wherein the means for controlling the cooling power comprise a shielded resistor located in front of the thermal sink.

18. The system of claim 1, wherein the heat flow from the surface to be thermally compensated is controlled to generate one or more cold spots on the surface to be thermally compensated.

19. The system of claim 1, wherein the imaging arrangement and the one or more thermal sinks are configured to control the heat flow from the surface to be thermally compensated in order to balance the surface to be thermally compensated at a lower temperature.

20. The system of claim 1, wherein the imaging arrangement comprises one or more wedged baffles.

21. The system of claim 20, wherein the imaging arrangement further comprises one or more mirrors.

22. The system of claim 20, wherein the wedged baffles are held at room temperature.

23. The system of claim 1, further comprising thermal shields housing the one or more thermal sinks.

24. The system of claim 1, wherein the imaging arrangement and the one or more thermal sinks are housed in a vacuum chamber.

25. The system of claim 1, wherein surface contour of the one or more thermal sinks is configurable to control the heat flow from the surface to be thermally compensated.

26. The system of claim 25, wherein configuration of the surface contour of the one or more thermal sinks controls the thermal sink thermal emission thus controlling the heat flow from the surface to be thermally compensated through the imaging arrangement.

27. The system of claim 1, wherein the one or more thermal sinks are configured as tunable temperature thermal sinks.

28. The system of claim 27, wherein one or more of the tunable temperature thermal sinks each comprise:
   a target head;
   a thermal bath;
   a stem connecting the thermal bath with the target head; and
   one or more electrical resistors.

29. The system of claim 28, wherein the one or more electrical resistors are located on the target head.

30. The system of claim 28, wherein the target head comprises a plurality of pyramidally shaped edges.

31. The system of claim 26, further comprising one or more shaped diaphragms placed in front of each target head.

* * * * *